Patented Mar. 11, 1941

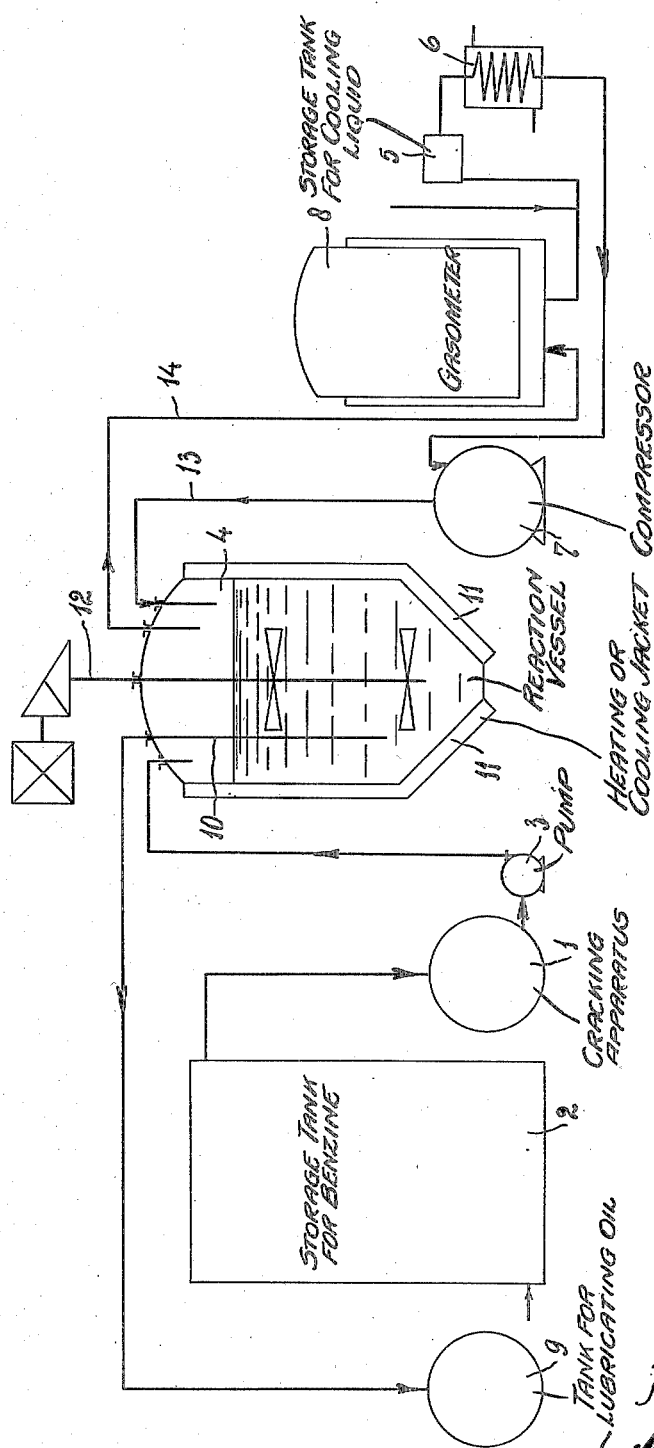

2,234,661

UNITED STATES PATENT OFFICE 2,234,661

METHOD OF PRODUCING LUBRICATING OILS

Heinrich Tramm, Oberhausen-Holten, Germany, assignor to Ruhrchemie Aktiengesellschaft, Oberhausen-Holten, Germany Application December 15, 1936, Serial No. 115,951
In Germany December 20, 1935

8 Claims. (Cl. 196—78)

My invention relates to lubricating oils, and more particularly to an improved method of producing same.

It is an object of my invention to produce lubricating oils having a low solidifying point.

It is another object of my invention to produce lubricating oils the viscosity of which varies only slightly with the temperature.

It is a further object of my invention to improve the general economy of the artificial production of lubricating oils.

It is a particular object of my invention to provide, in the production of lubricating oils, for a repeated use of a catalyst and more especially aluminium chloride in the conversion of successive charges of the starting products.

In U. S. Letters Patent 2,172,441 for a "Method for producing lubricating oils," filed August 18, 1936, by Herbert Goethel and Heinrich Tramm, a method of producing lubricating oils has been disclosed according to which are used as starting materials liquid hydrocarbon mixtures obtained by the catalytic conversion of mixtures of carbon monoxide and hydrogen under ordinary pressure and at moderate temperatures. The hydrocarbon mixture thus obtained which mainly consists of liquid paraffin hydrocarbons and liquid olefines, is exposed to a cracking process, the cracking conditions being so chosen, that a hydrocarbon mixture richer in unsaturated hydrocarbons results. The cracked products obtained in this process or their fractions boiling above 150° C., which contain a higher content of unsaturated hydrocarbons, but no, or only small quantities of, aromatic hydrocarbons, are subsequently treated, either totally or partly, with anhydrous aluminium chloride or some other polymerizing agent, so that by way of a condensation or polymerization viscous oils are obtained. The polymerizing catalyst may be used repeatedly for similar polymerizing reactions, if in the subsequent polymerization reactions the polymerization temperature is always correspondingly increased. By this repeated reuse of the polymerizing agent for fresh polymerization reactions the consumption of polymerizing agents is remarkably decreased.

It has, however, been found that the efficacy of the polymerizing agent or catalyst which has been used repeatedly, is finally reduced to such an extent that it must be replaced by a fresh quantity of catalyst, since by further increasing the polymerizing temperature the course of the reaction would be deranged and the catalytic mass would be damaged. In U. S. Letters Patent 2,187,704 filed December 15, 1936, for a "Method of producing lubricating oils" Nikolaus Geiser and Herbert Goethel have disclosed that at this stage of the process the catalyst can be revived by an addition of a small quantity, for instance a few per cent, of fresh catalyst and can then be used afresh for a series of polymerization reactions, which are again started at comparatively low temperatures, while the temperature is increased in each subsequent reaction.

I have now found that a given quantity of a benzine rich in olefines can be acted upon to form lubricating oils with a still lesser consumption of polymerizing catalysts such as aluminium chloride by controlling the temperature during the polymerizing reaction in a well defined manner and by employing a well defined proportion of the polymerizing catalyst in respect to the quantity of the benzine. I allow the temperature to rise slowly during the polymerization, and I use a quantity of the polymerizing catalyst which is too small as to suffice for converting the whole of the benzine used at the temperature at which this reaction is started. I thereby attain the further advantage that less operation steps are required, insofar as a contact layer formed in the reaction must not so frequently be separated from a benzine layer which contains the lubricating oil produced.

The terms "polymerization" and "condensation" used in the present specification are not intended to exclude each other. Besides a polymerization of similar hydrocarbon molecules to larger ones also condensation of different hydrocarbon molecules will take place as a rule.

The drawing accompanying this specification is a flow sheet illustrating one embodiment of my invention.

I may employ the same starting materials as mentioned above or some other hydrocarbon mixtures rich in olefines which mixtures can as a rule be obtained mainly by the following five methods:

1. By cracking the liquid paraffins and solid paraffins dissolved in these liquid hydrocarbons, which are all obtained in the synthetic production of benzine from carbon monoxide and hydrogen;

2. By catalytic dehydrogenation of any hydrocarbon oils free from aromatic compounds, for instance of mineral oils;

3. By fractionally distilling petroleum, in order to obtain fractions rich in olefines, and, if desired, combining several such fractions;

4. By thermic polymerization of gaseous olefines;

5. By suitably guided hydrogenation of carbon oxide.

I will first explain more in detail these five methods of obtaining my starting materials.

The first method consists in principle of two parts, the synthetic production of benzine from carbon monoxide and hydrogen and the cracking of the hydrocarbons thus obtained. The hydrogenation of the carbon monoxide may be carried through for instance with the aid of a cobalt-thorium-kieselguhr catalyst and in the manner described in a copending application for U. S. Letters Patent, Serial No. 114,186, filed December 4, 1936, by Walter Feisst, Hans Neweling and Otto Roelen for "Conversion of carbon oxides into higher hydrocarbons." This catalyst may for instance be prepared by precipitating a solution containing a cobalt salt and a thorium salt with an aqueous sodium carbonate solution, the precipitate settling on kieselguhr contained in the salt solution the catalyst, when separated from the solution by filtration and dried, is reduced first with hydrogen at 300 to 350° C. and then contains 37.3% cobalt, 6.7% thorium oxide and 56.0% kieselguhr. Through a furnace charged with this catalyst a gas mixture consisting of 28 to 29% carbon monoxide, 56 to 60% hydrogen, the remainder being carbon dioxide and nitrogen, may be passed, at the rate of 4 litres hourly per 10 grams catalyst, at a temperature of about 185–190° C. Every 24 hours a quantity of hydrogen equal to the quantity of gas under treatment is passed during one hour at 180–185° C. through the furnace and the high molecular paraffin hydrocarbons formed during the synthetic process and settled on the catalyst are thereby removed partly under the form of solid paraffin or of high boiling oils or in part as methane or other hydrocarbon gases. Directly after the treatment with hydrogen has come to an end, the gas mixture under treatment is passed again in contact with the catalyst, which will at once form 100–110 grams liquid products per cubicmeter of the gas mixture. The catalyst may also be treated with steam before being treated with hydrogen.

Instead of the cobalt-thorium-kieselguhr catalyst an alkalinized iron catalyst may be used which can be obtained by heating ferric nitrate to convert it into ferric oxide which is then treated with 1 to 2% potassium carbonate, whereupon the mixture is reduced with hydrogen; this contact consists of about 98% metallic iron and about 2% potassium carbonate. With this catalyst the mixture of carbon monoxide and hydrogen mentioned above may be used, the operating temperature being about 250° C. At intervals of four days the temperature of the catalyst is lowered to about 110° C. and the high melting paraffin is extracted from the catalyst within the synthetical furnace with the aid of a benzine fraction boiling between 130 and 140° C. After the extraction has come to an end, hydrogen is passed through the catalyst, the temperature being at the same time raised to about 250° C. Shortly after this temperature has been reached, the starting gas mixture is again passed in contact with the catalyst and the synthetical process continued during about four days, before another regeneration operation is resorted to. The extracted solution may be subjected to distillation to separate the solvent from the high melting paraffin.

Instead of the cobalt or iron catalysts mentioned above a nickel contact may also be used. The preparation of such nickel catalyst and the hydrogenation of the carbon monoxide with its aid may be carried through in the following manner: purified kieselguhr is suspended in water and a mixture of nickel nitrate and thorium nitrate, containing 12% metallic thorium, calculated on nickel, is added. The mixture is precipitated with a soda solution and the precipitate is filtered with suction, washed and dried. The catalyst thus obtained is first reduced in a current of hydrogen at 350° C., whereafter a mixture of carbon monoxide and hydrogen in the proportion of 1:2 is passed over it at a temperature of about 180° C. During the first hours only methane will be formed, thereafter the contraction diminishes and higher homologs occur. After 24 hours colorless oils separate out and benzine may be observed in the gases. If 5 grams of the metals are used in the contact mass which is spread by means of the kieselguhr carrier over a layer 30 cms. in length and if four liters of gases are passed thereover per hour, a contraction of about 40% will be observed, while after 24 hours about 120 ccms. of liquid hydrocarbons per cubicmeter of the gas used will be produced very uniformly during several weeks.

Any benzine obtained according to one of the methods described above may be cracked for the production of benzine richer in olefines. The cracking treatment is carried through at temperatures ranging from about 450° to 550° C. and under a pressure ranging from about 8 up to 15 atmospheres. Temperatures of 460–510° C. have proved particularly suitable. The time during which the hydrocarbon vapors are caused to remain in the cracking zone, depends on the cracking temperature and is the shorter, the higher the cracking temperature is chosen. At a temperature of about 480° C. the time of cracking may for instance be about 3 minutes.

As starting material for the cracking treatment are preferably used the hydrocarbon oils boiling between 150 and 350° C. which are obtained by the hydrogenation of carbon monoxide. Every 24 hours 55000 kgs. of this product are introduced into the cracking apparatus. The hydrocarbon oils are split for instance at a temperature of 480° C. and under a pressure of about 10 atmospheres the time of reaction being about 3 minutes. The gases and vapors leaving the cracking apparatus are led to a fractionating column, from which the gases as well as the vapors of the split benzines escape while the non-split parts of the hydrocarbons are recycled into the cracking device. The proportion of the freshly introduced hydrocarbon oils to the recycled, non-split parts of the hydrocarbons is 1:4, so that every 24 hours in all 275000 kgs. hydrocarbon oils, viz. 55000 kgs. fresh oils and 4 times 55000 kgs. recycled products are introduced into the cracking apparatus. The gases and vapors escaping from the fractionating column are subsequently condensed to yield 75–77% split benzines, which are used in the polymerization or condensation treatment according to our invention and 23–25% gases.

To the polymerization or condensation treatment may also be exposed liquid hydrocarbons obtained according to the second method mentioned above, viz. by catalytic dehydrogenation of hydrocarbon oils such as mineral oils. The dehydrogenation may be carried through for instance in a known manner by leading the oil vapors at temperatures of about 500° C. and under ordinary pressure in contact with catalysts consisting of oxides of molybdenum, zinc and magnesium and deposited on porous refractory carriers such as porcelain.

While the third method mentioned above is obvious to the expert, I will now describe more in detail the fourth method. By thermic polymerization of gaseous olefines so-called "polymeric benzines" are obtained which, being benzines rich in olefines, may be exposed to my polymerization treatment. In order to produce such "polymeric benzines" for instance a gas containing 61% propylene may be passed at a temperature of about 460° C. and under a pressure of about 100 atmospheres through empty tubes. The gas is then led through a tube of narrower cross section which is heated to about 500° C. From there the residual gases are passed through a third tube of still narrower cross section heated to about 525° C. The olefines present are thereby converted to the extent of 95% into liquid, highly valuable benzines.

According to the fifth method mentioned above the starting materials for the production of lubricating oils are obtained by a suitably controlled hydrogenation of carbon oxide for instance by carrying through the synthesis by means of a mixture of carbon monoxide and hydrogen which contains more than one part carbon monoxide for two parts hydrogen. I may therefore use for instance ordinary water gas which has not been enriched with hydrogen. It is well known that in the synthetical production of benzine carried through under ordinary pressure and with the aid of such gases rich in carbon oxide benzines will be obtained which are comparatively rich in olefines.

I prefer to use as starting materials benzines rich in olefines obtained by cracking liquid or solid hydrocarbons which were obtained in the hydrogenation of carbon monoxide as described above in connection with the first method. I then succeed in obtaining lubricating oils of quite particularly good properties as regards their solidifying point and their viscosity pole level calculated according to Ubbelohde (cf. "Zur Viskosimetrie," published in 1936 by S. Hirzel, Germany). In this way I obtain lubricating oils of a solidifying point down to −35° C. and with a viscosity which is extremely little dependent on the temperature.

The said mixtures of hydrocarbons rich in olefines or their fractions which boil above 100–150° C., may be condensed or polymerized to form viscous oils with a very slight consumption of polymerizing agents or catalysts by using the catalyst for a sequence of several reactions.

I have now found that I am able to save a particularly large quantity of polymerizing catalysts which would be otherwise needed by using in the first polymerization reaction a quantity of aluminium chloride or of some other polymerizing catalyst which is too small in proportion to the quantity of benzine rich in olefines to suffice for securing a sufficient conversion of the benzine when the polymerization process is carried through within a single range of temperatures. I succeed in obtaining a complete conversion of the benzine rich in olefines, while carrying the condensation through in a single stage, by gradually increasing, in the course of the polymerizing reaction, the polymerizing temperature, either continuously or stepwise. This mode of operation offers the great advantage that with a given quantity of aluminium chloride materially larger quantities of benzine can be converted in a single charge, than in the case where unsaturated benzines are converted with an equal quantity of aluminium chloride at a constant polymerization temperature. In order to convert a large quantity of unsaturated benzines with a given quantity of aluminium chloride in the manner last mentioned, i. e. at a constant reaction temperature, it was hitherto necessary to divide the amount of benzine into several charges, which had to be treated singly, and to use the polymerizing catalyst employed in a preceding polymerization reaction for the conversion of the next following charge of benzine, the conversion temperature being increased from charge to charge. In this way one had to separate off the catalyst layer, and to work up the products of the reaction very frequently, whereas I am only required in accordance with my new method to carry through these operations once, when working up an equal quantity of benzine.

I have found that I can effect a still greater saving in polymerizing agents such as aluminium chloride by adding to the exhausted aluminium chloride, after the highest temperature has been reached, i. e. after the conversion has come to an end, a small quantity of fresh aluminium chloride, whereafter the conversion, for instance of a fresh charge of cracking benzine, may be started again at low temperature.

The following example will illustrate this method more in detail.

*Example 1*

To 1000 grams of a cracked benzine having a density of 0.692 at 20° C. and with a content of 45% of unsaturated hydrocarbons were added 10 grams anhydrous aluminium chloride. The mixture was exposed to a polymerization reaction wherein the temperature was gradually continuously increased. During 120 hours the starting temperature of 20° C. was continuously increased up to 100° C. After the conversion had come to an end, the benzine layer which contained the lubricating oil formed, was separated from the contact layer, which consisted of aluminium chloride and double compounds of aluminium chloride, and was distilled to yield 424 grams lubricating oil. The proportion of lubricating oil obtained to aluminium chloride consumed was thus 42:1. After addition of a small quantity (about 10 to 20% of the quantity originally used) of fresh anhydrous aluminium chloride to the catalyst layer separated off, this layer may be reused for the conversion of cracked benzine, starting again at a low temperature, for instance 20° C.

I have further found it necessary to remove in every phase of the polymerization the heat, which occurs in the polymerization reaction, at suitable temperatures. Thus the heat may not arbitrarily be removed—as was hitherto the case—but care must be taken that from the beginning of the reaction the heat developing is withdrawn only to such an extent that the temperature slowly rises during the time of polymerization to reach a defined end temperature.

*Example 2*

Cracked benzine and aluminium chloride in the quantities mentioned above were introduced into a well insulated vessel and stirred therein. The heat of polymerization rapidly carried the mixture to 70° C. After this temperature had been reached, cooling was started and the heat developed was withdrawn. In working up the products obtained, it could be seen that a violent polymerization had occurred and that polymerization products of low molecular weight were formed predominantly. When the same cracked benzine was caused to react in the same vessel with the same quantity of aluminium chloride, care being however taken, that from the beginning the heat developed was withdrawn to such an extent that the temperature rose slowly during twelve hours to 70° C., valuable highly polymerized oils were obtained. When in a third test the cooling effect was too strong, the temperature did not rise, the reaction stopped and practically no polymerization occurred.

I prefer to start polymerization of the unsaturated hydrocarbons at the lowest possible temperature ranging about from 0–30° C., and to retardate by cooling the reaction which would otherwise proceed too rapidly so that in the reaction vessel the temperature developed by the heat in the polymerization step rises only slowly and that the end temperature reached in the polymerization in the course of 6 to 20 hours will not exceed 50–80° C. for heavy oils and 100–120° C. for light oils.

The benzine charge in reaction may be cooled either from without or, directly or indirectly, from within or by a combination of these two measures, it being advisable to distribute the heat in the reaction vessel by vigorously stirring the reaction mixture.

In consequence of the physical state of the contact layers formed in the conversion of the unsaturated oils with a polymerizing catalyst such as $AlCl_3$ it is very difficult to accurately control the temperature in the reactions in view. To cool from without and to simultaneously stir the reaction mixture does not as a rule suffice to remove with sufficient speed the large quantities of heat produced in the vessel. On the other hand in view of the particular structure of the contact layers it is practically hardly possible to remove further heat by applying suitable cooling surfaces. In the production of viscous oils by condensing mixtures of unsaturated hydrocarbons it has already been proposed to add indifferent oils to the reaction mass in order to diminish the concentration of reactive substances and the heat developed. This mode of operation however involves the drawback that large quantities of diluents must be added to and must be removed by distillation from the viscous oils produced, after the reaction has come to an end.

I have found it advantageous to add to the unsaturated oils to be converted inert substances which boil readily, such as propane, butane or pentane or their unsaturated homologs or mixtures of these hydrocarbons, the vaporization of which brings about a withdrawal of heat from the reaction mass. I have ascertained by measurements that the quantities of heat developed in the lubricating oil condensation per kilogram of the oil amount to 150–200 kgs./calories. I may proceed in different manners to remove these quantities of heat at well defined temperatures which it is important to maintain for the polymerization.

One may for instance supply under atmospheric pressure to the reacting mass, kept rapidly moving by stirring, so much low boiling hydrocarbons that the heat consumed in the vaporization of the quantity of these hydrocarbons introduced corresponds to the heat of condensation or polymerization developed. In this case the escaping vapors may be condensed again outside of the reaction apparatus.

One may also supply from the beginning a certain quantity of low boiling substances to the conversion vessels which are provided with reflux condensers. The low boiling substances vaporize during the reaction, but are condensed in the reflux condensers. In this manner of operation a well defined reaction temperature may be maintained by simultaneously adjusting the polymerization temperature and the corresponding vapor pressure by means of the cooling agent which is vaporized, recondensed and returned into the stirring vessels in cycle.

In order to prevent, in this mode of operation, the pressure in the reaction vessels from exceeding the desirable limits, it is expedient to employ higher boiling cooling agents, whenever higher reaction temperatures are used.

The drawing illustrates the mode of operation in which heat from the reaction mass is withdrawn by supplying to this mass low boiling substances, serving as cooling agents, and withdrawing, and subsequently condensing, the vapors of these cooling agents formed in the reaction vessel. I represents a cracking apparatus, 2 a storage tank of benzine to be cracked and 3 a pump for leading the cracked benzine into the reaction vessel 4, which is provided with a heating or cooling jacket 11 and a stirring device 12. 5 is a storage tank for a cooling liquid, 6 a condenser and 7 a compressor; 8 is a gasometer forming part of the cooling device. The cooling liquid is led into the reaction vessel 4 by pipe 13, the vapors are withdrawn by pipe 14. 10 is a plunge pipe for withdrawing the converted benzines from the reaction vessel, while 9 is a tank for storing the lubricating oil obtained.

Various changes may be made in the details disclosed in the foregoing specification without departing from the invention or sacrificing the advantages thereof.

I claim:

1. The method of producing lubricating oils from olefines, comprising the steps of causing, by the addition of aluminum chloride as a polymerizing catalyst, a hydrocarbon mixture mainly consisting of aliphatic hydrocarbons and being rich in olefines to polymerize, progressively increasing the polymerizing temperature, while the reaction proceeds, at a rate of less than about 20° C. per hour by at least about 50° C., without materially exceeding 120° C. separating said polymerizing catalyst from the lubricating oil produced and reusing it subsequently in another polymerization reaction of the same kind starting at a temperature substantially lower than that reached in the preceding polymerization reaction and not materially exceeding 120° C.

2. The method of claim 1, wherein the polymerization reactions are started at temperatures ranging about between 0° and 30° C. and the starting temperature is allowed to rise slowly as the polymerization proceeds.

3. The method of claim 1, wherein, in order to produce highly viscous lubricating oils, the heat developed in the polymerization step is withdrawn to such an extent that the gradually rising temperature does not exceed 50°–80° C.

4. The method of claim 1, wherein the quantity of polymerizing catalyst added to the hydrocarbon mixture is less than that required for the maximum polymerization of the olefines attainable with the catalyst employed at the temperature at which the polymerization is started.

5. The method of producing lubricating oils from olefines, comprising the steps of causing, by the addition of aluminum chloride as a polymerizing catalyst, a hydrocarbon mixture mainly consisting of aliphatic hydrocarbons and being rich in olefines to polymerize, progressively increasing the polymerizing temperature, while the reaction proceeds by at least about 50° C. and at a rate of less than about 20° C. per hour without materially exceeding 120° C., separating said polymerizing catalyst from the lubricating oil produced, adding to said polymerizing catalyst a small proportion of fresh polymerizing catalyst in order to revive it and reusing the mixture subsequently in another polymerization reaction of the same kind starting at a temperature substantially lower than that reached in the preceding polymerization reaction and not materially exceeding 120° C.

6. The method of producing lubricating oils from olefines, comprising the steps of causing, by the addition of aluminum chloride as a polymerizing catalyst, a hydrocarbon mixture mainly consisting of aliphatic hydrocarbons and being rich in olefines to polymerize in the presence of a readily boiling substance being inert under the operating conditions, causing part of this inert substance to evaporate by the heat developed in the polymerization reaction in order to progressively increase the polymerization temperature, while the polymerization reaction proceeds, at a rate of less than about 20° C. per hour by at least about 50° C., without materially exceeding 120° C., separating said polymerizing catalyst from the lubricating oil produced and subsequently reusing said catalyst in another polymerization reaction of the same kind starting at a temperature substantially lower than that reached in the preceding polymerization reaction and not materially exceeding 120° C.

7. The process of claim 6, wherein a member of the group consisting of propane, butane, pentane and their unsaturated homologs in liquid state is used as readily boiling inert substance.

8. The method of producing lubricating oils from olefines, comprising the steps of causing, by the addition of aluminum chloride as a polymerizing catalyst, a hydrocarbon mixture mainly consisting of aliphatic hydrocarbons and being rich in olefines to polymerize in the presence of a readily boiling substance being inert under the operating conditions, causing part of this inert substance to evaporate by the heat developed in the polymerization reaction, condensing the vapors and returning the condensate in cycle into the reacting mixture, controlling the temperature, at which said vapors are caused to condense, and the vapor pressure in such way that the polymerization temperature progressively increases, while the polymerization reaction proceeds, at a rate of less than about 20° C. per hour by at least about 50° C., without materially exceeding 120° C., separating said polymerizing catalyst from the lubricating oil produced and reusing it subsequently in another polymerization reaction of the same kind starting at a temperature substantially lower than that reached in the preceding polymerization reaction and not materially exceeding 120° C.

HEINRICH TRAMM.